(12) United States Patent
Talati et al.

(10) Patent No.: US 7,185,331 B2
(45) Date of Patent: Feb. 27, 2007

(54) METHOD AND APPARATUS FOR DOWNLOADING EXECUTABLE CODE IN A NON-DISRUPTIVE MANNER

(75) Inventors: Naresh Talati, Voorhees, NJ (US); Anton Bodner, Jr., Turnesville, NJ (US)

(73) Assignee: Inrange Technologies Corporation, Minneapolis, MN (US)

( * ) Notice: Subject to any disclaimer, the term of this patent is extended or adjusted under 35 U.S.C. 154(b) by 0 days.

(21) Appl. No.: 10/228,044

(22) Filed: Aug. 27, 2002

(65) Prior Publication Data

US 2004/0044997 A1    Mar. 4, 2004

(51) Int. Cl.
G06F 9/44 (2006.01)
G06F 1/24 (2006.01)

(52) U.S. Cl. ..................... 717/168; 713/100
(58) Field of Classification Search ............... 717/168, 717/170–173; 707/101, 102, 104.1; 714/15
See application file for complete search history.

(56) References Cited

U.S. PATENT DOCUMENTS

| 5,179,734 | A | * | 1/1993 | Candy et al. ................... 712/1 |
| 5,410,703 | A | * | 4/1995 | Nilsson et al. ............... 717/168 |
| 5,481,713 | A | * | 1/1996 | Wetmore et al. ............ 717/170 |
| 5,579,522 | A | * | 11/1996 | Christeson et al. ............ 713/2 |
| 5,822,692 | A | * | 10/1998 | Krishan et al. ............. 455/419 |
| 5,835,761 | A | * | 11/1998 | Ishii et al. .................. 713/100 |
| 5,878,256 | A | * | 3/1999 | Bealkowski et al. ........... 713/2 |
| 5,920,725 | A | * | 7/1999 | Ma et al. ..................... 717/171 |
| 5,930,504 | A | * | 7/1999 | Gabel ............................. 713/2 |
| 6,009,520 | A | * | 12/1999 | Gharda ......................... 713/1 |
| 6,138,274 | A | * | 10/2000 | Huang et al. ................ 717/168 |
| 6,141,771 | A | | 10/2000 | O'Brien et al. ................ 714/15 |
| 6,189,145 | B1 | * | 2/2001 | Bellin et al. ................. 717/170 |
| 6,202,208 | B1 | * | 3/2001 | Holiday, Jr. ................. 717/166 |
| 6,223,336 | B1 | * | 4/2001 | Tojima ........................ 717/174 |
| 6,397,385 | B1 | * | 5/2002 | Kravitz ........................ 717/173 |
| 6,442,660 | B1 | * | 8/2002 | Henerlau et al. ........... 711/165 |
| 6,715,068 | B1 | * | 3/2004 | Abe ............................... 713/1 |
| 2002/0083432 | A1 | * | 6/2002 | Souissi et al. .............. 717/178 |
| 2002/0107862 | A1 | * | 8/2002 | Moore et al. ............... 707/101 |

OTHER PUBLICATIONS

"Dual Indirect RAM/ROM Jump Tables for Firmware Updates", Jun. 1988, IBM Technical Disclosure Bulletin, IBM Corporation, vol. 31, No. 1.*
Synchrotech, Inc., "An Introduction to PCMCIA and PC Card Technology", 1995, [online, archived Feb. 2001, accessed Dec. 23, 2003], <http://web.archive.org/web/20010210110342/http://www.synchrotech.com/support/intro.html>.*

* cited by examiner

Primary Examiner—Tuan Dam
Assistant Examiner—J. Derek Rutten
(74) Attorney, Agent, or Firm—Beck & Tysver, P.L.L.C.

(57) ABSTRACT

A method and apparatus for achieving a non-disruptive code load that includes staging the new version of executable code, stacking the hardware events during code copy and code switch over, copying the code into the runtime area, restarting the system upon completion of copying the new code without reinitializing the hardware and processing the stacked hardware events with the same system state (hardware and firmware) information.

24 Claims, 3 Drawing Sheets

METHOD AND APPARATUS FOR DOWNLOADING EXECUTABLE CODE IN A NON-DISRUPTIVE MANNER

FIELD OF THE INVENTION

The present invention relates generally to downloading firmware code onto a processor controlling hardware devices. More particularly, the present invention relates to downloading firmware code to a processor in an active system such that it does not disrupt the system operation (hardware and firmware).

BACKGROUND OF THE INVENTION

The field of computer technology advances at almost a lightening pace. Equipment rarely has more than a five-year life. In most instances, the life is only two to three years. In some instances, it is possible to replace various pieces of the equipment. In other instances, all that is required is an upgrade of the firmware. The problem arises in that system up time is required to be approximately one hundred percent in today's world of the Internet. Computer equipment owners demand near perfect operation of their equipment. Owners talk in terms of anything less than 99.999% availability as being unacceptable.

Shutting down a computer system can cost a company thousands and thousands of dollars for each hour the system remains unavailable. Upgrades of computer equipment usually result in some downtime of the processing. This has resulted in technology assistants upgrading equipment at odd hours of the morning. This results in additional costs to the company as well. Even this has become difficult due to different time zones and globalization.

Firmware upgrades on larger computer systems are needed to add additional features or fix reoccurring problems or bugs. In light of the financial consequences of shutting down a system, there is a need to upgrade firmware without disrupting the system operation. Prior systems involve halting the realtime system, while the upgrade in code is performed. This is not ideal for the aforementioned reasons. Furthermore, the owner of the equipment is more reluctant to perform upgrades or fix bugs unless absolutely necessary.

Accordingly, it is desirable to provide an apparatus and method that enables the owner of computer systems to upgrade their firmware to add new features or fix firmware bugs without any system down time. The computer system would run or operate in real time and continue to process requests.

SUMMARY OF THE INVENTION

It is therefore a feature and advantage of the present invention to provide a method and apparatus for downloading a new version of an executable code onto a system without the need to bring the system to a halt, thereby sacrificing system up time.

It is another feature and advantage of the present invention to provide a fast and efficient means of processing time to upgrade a system to the new version of code.

The above and other features and advantages are achieved through the use of a novel fixed area to store state information as well as keeping key components of the previous version of executable code from being upgraded as herein disclosed. In accordance with one embodiment of the present invention, a non-disruptive code load apparatus can include a storage device for storing state information for a computing system such that the state information is retained through a new version of executable code, a staging device for receiving a new version of executable code and a runtime area or processing area that receives the new version of executable code. Upon executing the new version of executable code, the system is restarted and the old version of executable code removed from the system. The system is restarted from the last state prior to the code upgrade.

In another embodiment of the invention, the code is transferred from the staging area to the runtime area with the copy part of the old version of executable code. This copy part of the executable code remains the same through all the upgrade versions.

In another embodiment of the invention, the state information is stored in a memory device. The staging area for the new version of executable code is also stored in a memory device such as random access memory.

In another aspect of the invention, a method for non-disruptive code loading includes staging a new version of executable code, transferring the executable code to a runtime area and restarting a system with the new version of the executable code without reinitializing the hardware and the system (hardware and firmware) state information.

During operation of the system, state/runtime information concerning the system is stored in a fixed area. This fixed area and the state information contained therein is not altered or changed during upgrades of the executable code.

The transferring of the new version of executable code can be achieved with the copy part of the previous version of the executable code. As a result, the copy part of the code remains the same between these upgrades.

In another aspect of the present invention, a non-disruptive code load apparatus includes means for staging a new version of executable code, means for transferring the executable code to a runtime area and means for restarting a system with the new version of the executable code. A further element includes means for storing state information about the system in a fixed area, which is not altered with new version of the executable code without reinitializing the hardware and the system (hardware and firmware) state information.

In a further aspect of the present invention, a method for non-disruptive code loading includes storing state information about a system in a fixed area that is not altered upon a new version of executable code, staging the new version of executable code in memory, copying the executable code to a runtime area and restarting the system with the new version of the executable code wherein the new executable code uses the same system state information.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
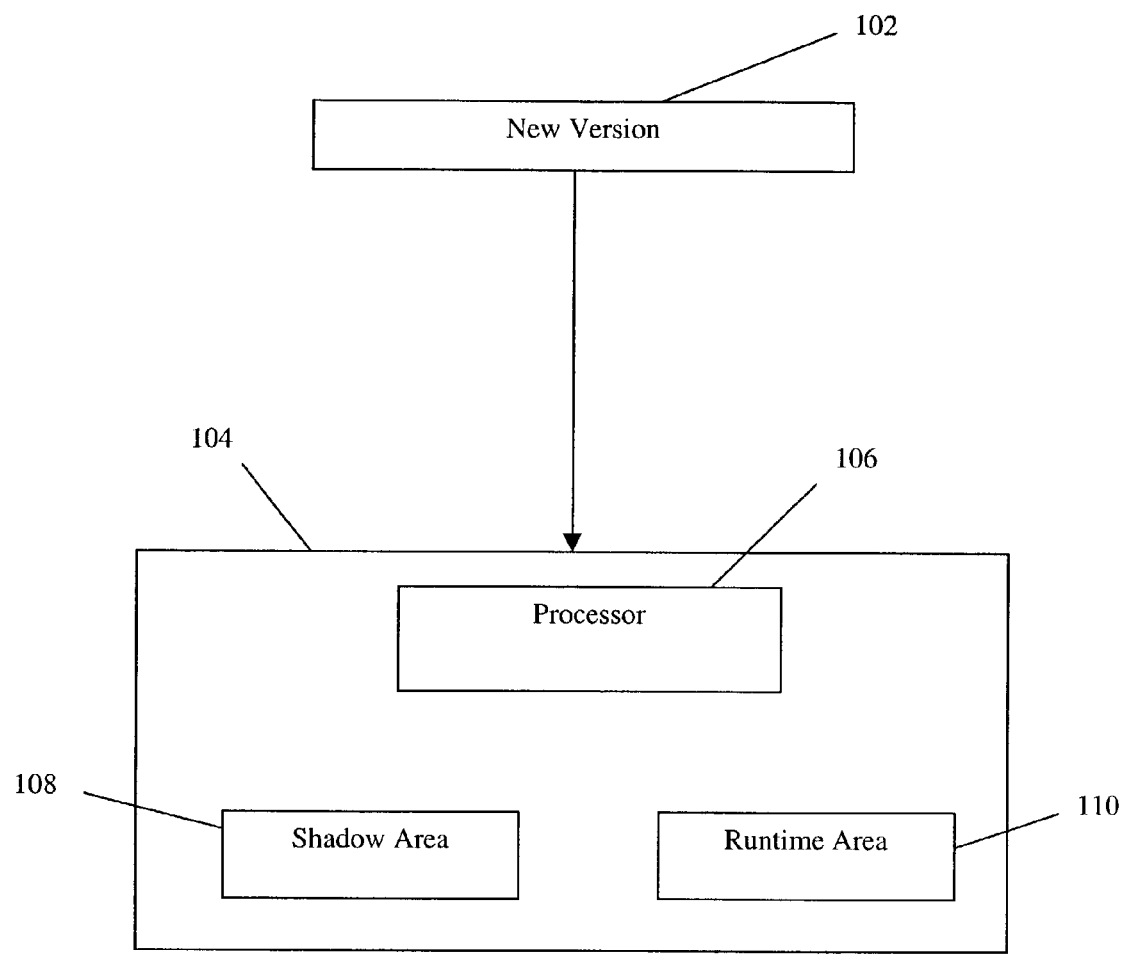
FIG. 1 is a block diagram illustrating several elements of a preferred embodiment of the present invention.

A preferred embodiment of the present invention provides an apparatus for downloading executable code in a manner that is non-disruptive to the system such that the system is able to continue operating without the need to sacrifice any system down time.

In the compiling of most high-level computer programming languages such as C, the resulting output generally partitions the memory usage into three default sections. The first is a text section, which is the machine level instructions, the native assembly code. This section appears as part of the binary output file. The second section is labeled the data section, which is initialized data. The data section contains any literal data values or strings that may be acted upon. The data section can consist of initialized global and/or private data, as well as constant data. This section appears as part of the binary output file. The third and final section is labeled Bss, which is unintialized data. This section represents data structures that exist in code, but are not initialized at compile time. It is assumed that they are initialized before used during execution. This section is part of the binary file.

A programmer may create other memory sections, assign variables, code and data program elements to each section as desired. A programmer may then assign these sections to specific locations in memory. In general, these new additional sections derive from one of the three default sections, text, data and Bss.

In the preferred embodiment, the executable code is written such that any information that needs to persist between code revisions is assigned to a specific user defined memory section known as the fixed_data section. Some of the information that is saved in this section is the system (hardware and firmware) state information, volatile data information and runtime information that is required to be preserved between these code revisions.

The make-up of the fixed_data section is rigid. It is usually at approximately the same memory location through every code revision. The layout of this section is approximately the same except for addition at the end of the section. However, it is possible for this section to be adjusted based on the programmer's needs or requirements. For example, this section may be enlarged to support new data elements for new features in newer executable code versions. In the preferred embodiment, this section is given a maximum allocation limit to which it may expand. This occurs upon the original design limitation of the programmer. Therefore, it is important that the programmer leave sufficient space to grow with new versions of the code. In the preferred embodiment, the obsolete features, e.g. data elements no longer used, remain in this section to preserve its integrity and fixed layout. Furthermore, the fixed_data section derives from the Bss section (unintialized) category and is not part of the binary output file that is generated upon compiling the code.

Another user defined memory section of the executable code is the copier section or function. This section consists of usually a fixed number of lines of code, approximately fifty, that in the preferred embodiment, does not change between code revisions. The copier section is written in assembly language to ensure that this code is not altered as well as to be extremely fast. The assembly language, the basic language of all computing devices, requires less translation and compiling and therefore less processing time. This results in a fast efficient process.

In the preferred embodiment of the present invention, the copier section's purpose is to copy code from one area of the memory to another. The copier section is derived from the text section and is part of the binary output file.

A preferred embodiment of the present inventive apparatus and method is illustrated in FIG. 1, which is a block diagram illustrating several elements of a preferred embodiment of the present invention. The present invention is used with the channel director product, CD/9000, of Inrange Technologies Inc. Lumberton, N.J. The new version 102 of executable code is presented to the system 104 for upgrade purposes. The upgrade of firmware code occurs due to individual feature specific needing upgrade or a need to upgrade the overall ability of the code.

The system 104, at its most basic level includes a processor 106, shadow area 108 and a runtime area 110. The new code or version 102 is assembled outside the system 104 and made available for incorporation therein. The shadow memory 108 accepts the initial download of the new version 102 of executable code. In other words, the shadow area 108 is essentially a staging area prior to the new version 102 taking effect in the system 104. Once the new version 102 is placed in the shadow area 108, the system waits for an opportunity to transfer it to the runtime area 110 via the copier section of the code of the executable code in the runtime area.

The shadow area 108 is a section of memory reserved for staging the new version 102. The new code is staged in this shadow area 108 to take advantage of the fast transfer of data from one memory location, shadow area 108, to another area, runtime area 110. The fast transfer is accomplished by maintaining the copier section of the code through all upgrades of the executable firmware. While the new code is being loaded into the shadow area 108, the current or older code in the system continues to operate. Essentially, the new version 102 is loaded as a background event.

The runtime area 110 is a part of the memory where processor 106 executes the executable code. The memory area consists of all memory sections, the normal text, Data and Bss sections as well as the user defined fixed data section and copier functions. Once the new version 102 is loaded, the system 104 and its firmware is requested to switch to the new code. The current firmware then stops processing all the hardware events, after time sensitive events are completed. Maximum time to process these pending hardware events is less than the actual code switching time from old code to new code. During the switching time, hardware events of the system 104 are stacked in the hardware since the design requires the hardware events to be processed by the firmware. When the new code does begin to execute or run, the common database, firmware state information, and hardware are not initialized. Since the firmware is state driven and new hardware events are stacked, the preferred embodiment allows non-disruptive executable code load. The preferred embodiment stops the system 104 operation while switching to the new version 102 from shadow area 108 to runtime area 110. With the Bridge QPA product from Inrange Technologies that facilitates connection between a CD/9000® (an electronic switch that provides fiber optic connectivity among computers and input/output units) and a FICON® high-speed input/output interface, the elapsed time is approximately fifty milliseconds.

The executable code does not initialize the hardware, which it is controlling, during restart. Hardware events, which occur during the code switch over are not processed during the code switch over. System requires hardware events to be acknowledged by the firmware. Since system states (hardware and firmware) are saved during the code switch over, new executable code processes pending hardware events, without disrupting the system operation.

Figure 2:
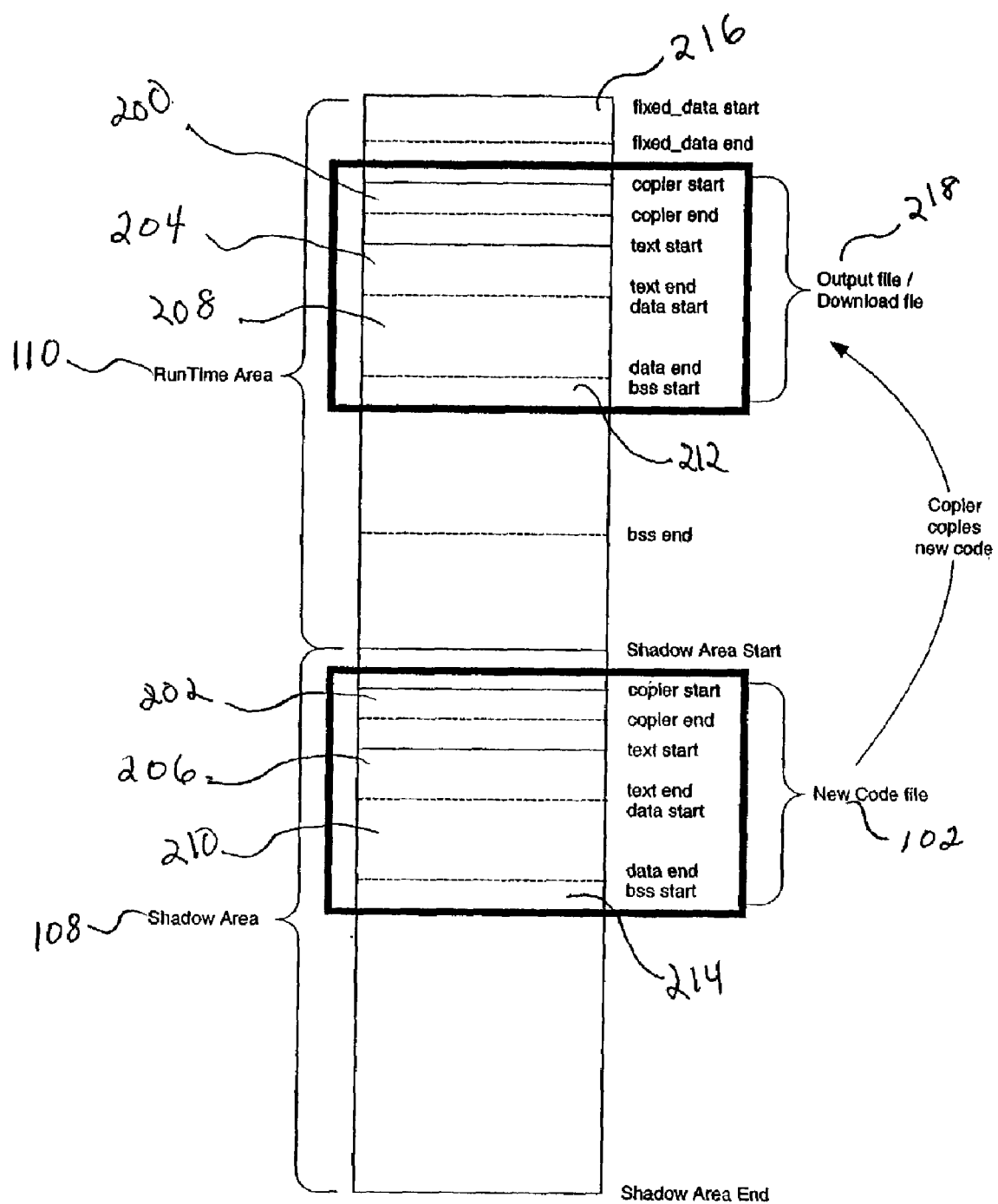
FIG. 2 is a diagram illustrating the interaction between the shadow area and runtime area of the present invention.

FIG. 2 is a diagram illustrating the interaction between the shadow area 108 and runtime area 110 of the present invention. This diagram shows the memory layout for the shadow area 108 and the runtime area 110 of the system 104. Each memory location includes a copier section 200, 202, a text section 204, 206, a data section 208, 210, and a Bss section 212, 214. The runtime area 110 also includes a fixed_data section 216.

In the preferred embodiment, some sections of the memory have fixed start addresses as well as a maximum expansion size. The actual size however is dependent upon each code release. However, the size allocated to the code downloaded into the system is usually chosen to be large enough to allow for code expansion for various versions or upgrades of the executable code.

Fixed addresses in FIG. 2 are denoted with solid lines and varying addresses are denoted with dashed lines. In general, the varying end address is limited by the fixed start address of the next section.

The diagram of FIG. 2 shows an order of the fixed section 216 of the memory. This orientation is completely arbitrary. However, in the preferred embodiment, the other sections of memory, are grouped together. Again this is not by design but due to the default. For example, the copier section 200, the text section 204 and the data section 208 are coupled because this is essentially the downloaded file. This is also the output file from the compiler. With regard to the Bss sections 212, 214, they appear immediately after the data section. However, like the previous section, this position is the default set by most compilers. Note that the memory addresses in the runtime area 108 are hardlinked. This means that the compiler is expecting the code to run at these locations.

Figure 3:
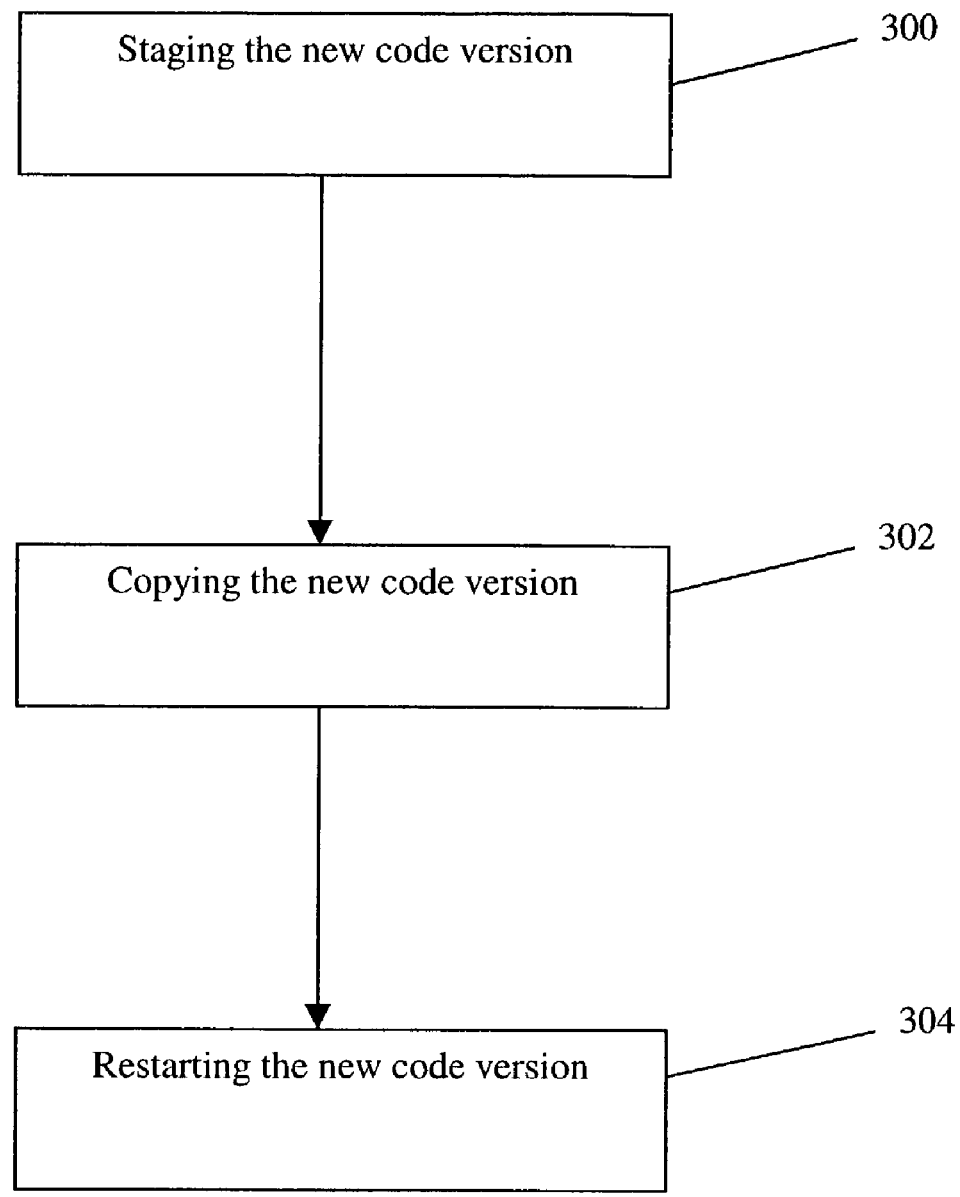
FIG. 3 is a block diagram of an alternate embodiment of the present invention.

FIG. 3 is a block diagram of an alternate embodiment of the present invention. In this embodiment, the new version 102 of executable code is staged in step 300 into the shadow area 108. The new code is not running or executed but merely resident in memory. As stated previously, the staging 300 the new version 102 is done as a background process and is not time critical unless so desired.

After staging step 300, the system waits for an opportunity to copy the new code version 102 from shadow area 108 to runtime area 110 in step 302 and restart step 304. The copy and restart stages 302 and 304 are time critical and usually must take place within a short period of time. In one embodiment of the invention, the time criticality is several milliseconds and generally less than ten milliseconds.

When the system 104 determines a good opportunity to copy new version 102 from shadow 108 to runtime area 110, system interrupts are disabled and the copying step 302 process begins. The system does not always need to make a determination of when to begin the copying step 302 of the new version 102 of the executable code from shadow area 108 to the runtime area 110. The system, through artificial means, can be forced to begin the copying process.

During the copying process 302, no other code is executed in the system 104. Furthermore, during the copying process 302, the copier process 302 overwrites its instruction memory as it is executing these instructions. Therefore, the present invention relies on the premise that the copier section 200 of the code is not altered or changed from one version to the other.

Once the copying process 302 has ceased, the new version 102 of executable code is restarted. The code is made to restart in step 304 or reboot in a fast and efficient manner. To accomplish this, much of the initialization routine done through a traditional power-up is skipped, specially all the hardware initialization. In one preferred embodiment of the invention, the new version 102 of executable code is restarted at the same state the system 104 was in prior to the copying process 302.

The state/runtime information is stored in the fixed_data section 216 and is not altered during the whole copying process 302. Since the state/runtime information is stored in the fixed_data section, which is where the compiler expects it, there is no runtime time penalty. This runtime penalty is present on other applications that store and retrieve data the code loading process. With the present invention, there is no need to store and retrieve state information during the code loading process.

After the system is restarted in step 304, the new code effectively begins to operates, turn on interrupts and begins to process data as if there were no changes to the code. The processor 106 is momentarily occupied for approximately five milliseconds while the copying process 302 and the restart process 304 is taking place.

The new version of code is rarely of a size that in will fit within the space constraints of the shadow area 108. Therefore, it necessary in these instances to compress the new version 102, after it is compiled, prior to its download to the shadow area 108 after it has been compiled.

When the code 102 is compressed for a download situation, the code placed in the shadow area 108 is essentially the output of a compiled program. For the preferred embodiment, the output of the compiled file essentially comprises three sections: (i) the compressed exerciser; (ii) compressed runtime executable; and (iii) loader/decompresser. The first two pieces are compressed images of runtime executables. In an uncompressed state, the runtime executable can be run or executed by the processor. The runtime executable controls all the switching properties of the CD/9000® electronic switch product. The other runtime executable, the exerciser, is a dianostic program.

The loader/compressor is needed to decompress the runtime executable. The decompressor piece is the only executable capable of being run by the processor directly. The decompressor does not compress the exerciser image. This is done by a different processor that references the exerciser image at a later time.

Upon using a compressed file, during the copying stage control is passed to the loader/compressor section the output file. The decompressor decompresses the runtime executable to the runtime area. For slave QPAs, the partitioned designated quad-port adapter (QPA) then receives a command to retrieve the new code. This QPA then forwards the message to all the QPAs in the partition via a fabric broadcast mechanism. All the QPAs in the partition receive the message to retrieve and decompress the new runtime executable. The QPAs decompress the new executable to the shadow area while servicing switching functions.

Finally, the runtime executable copies the new versions 104 over itself. The new version 104 begins running or executing approximately where the old code left off, using the already initialized variable in the fixed_data section 216.

The many features and advantages of the invention are apparent from the detailed specification, and thus, it is intended by the appended claims to cover all such features and advantages of the invention, which fall within the true spirits, and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for nondisruptive code loading of a hardware controller, comprising:
    a) saving a set of fixed instructions and a first runtime executable code in a runtime area of memory partitioned into a set of disjoint blocks beginning at fixed memory locations, said set including:
        (i) a fixed-data block;
        (ii) a copier block comprising a fixed copier section and a copier expansion section, said fixed copier section and said copier expansion section being mutually disjoint; and
        (iii) a runtime code block;
    b) storing a trusted system state within the fixed-data block;
    c) storing a first copier code having an instruction in the fixed-copier section within the copier block;
    d) executing the first runtime executable code;
    e) staging a second runtime executable code into a shadow area;
    f) suspending operation of the first runtime executable code;
    g) initiating execution of the first copier code, said execution causing a second copier code, stored within the shadow area, to be copied into the copier block without altering those instructions within the fixed copier section;
    h) copying the second runtime executable code from the shadow area into locations in the runtime area not containing the fixed instructions and not containing the trusted system state; and
    i) resuming operation with the second runtime executable code in the runtime area.

2. The method of claim 1, wherein the instruction in the first copier code is in assembly language.

3. The method of claim 1, wherein the hardware controller controls an electronic switch or an electronic bridge.

4. An apparatus for nondisruptive code loading, comprising:
    a) a runtime area of digital memory partitioned into a set of disjoint blocks beginning at fixed memory locations, said set including:
        (i) a fixed-data block;
        (ii) a copier block comprising a fixed copier section and a copier expansion section, said fixed copier section and said copier expansion section being mutually disjoint; and
        (iii) a runtime code block;
    b) a set of fixed instructions in the runtime code block;
    c) a first runtime executable code in the runtime code block;
    d) a trusted system state stored within the fixed-data block;
    e) a shadow area of memory;
    f) a second runtime executable code in the shadow area of memory;
    g) a first copier code, stored within the copier block, containing instructions to copy the second runtime executable code from the shadow area into a portion of the runtime area disjoint from the fixed instructions; and
    h) a second copier code, stored within the shadow area;
    wherein initiation of execution of the first copier code causes the second copier code to be copied into the copier block without altering those instructions within the fixed copier section.

5. The apparatus of claim 4, further comprising:
    i) a trusted system state in the runtime area of memory;
    and wherein the area into which copier instruction copy the second runtime executable is further disjoint from the trusted system state.

6. The apparatus of claim 4, wherein the copier instructions are in assembly language.

7. The apparatus of claim 4, wherein the apparatus is an electronic switch or an electronic bridge.

8. A system having nondisruptive code loading capability, comprising:
    a) a hardware device;
    b) a runtime area of digital memory partitioned into a set of disjoint blocks beginning at fixed memory locations, said set including;
        (i) a fixed-data block;
        (ii) a copier block comprising a fixed copier section and a copier expansion section said fixed copier section and said copier expansion section being mutually disjoint; and
        (iii) a runtime code block;
    c) a trusted system state stored within the fixed-data block;
    d) a first runtime code, stored within the runtime code block, beginning at a runtime start address;
    e) a first copier code, stored within the copier block, and having an instruction in the fixed-copier section;
    f) a shadow area of digital memory, disjoint from the runtime area;
    g) a second runtime code, stored within the shadow area; and
    h) a second copier code, stored within the shadow area;
    wherein initiation of execution of the first copier code causes the second copier code to be copied into the copier block without altering those instructions within the fixed copier section.

9. The system of claim 8, wherein initiation of execution of the first copier code further causes the second runtime code to be copied into the runtime code block beginning at the runtime start address.

10. The system of claim 8, wherein initiation of execution of the first copier code causes execution of an instruction within the second copier code not in the first copier code.

11. The system of claim 10, wherein the first copier code and the second copier code are in assembly language.

12. The system of claim 8, further comprising:
   i) a loader/decompressor code, stored within the shadow area, containing instructions to decompress the second runtime code into uncompressed instructions and load said uncompressed instructions into the runtime code block beginning at the runtime start address;
   and wherein initiation of execution of the first copier code further causes a transfer of control to the loader/decompressor code.

13. The system of claim 8, wherein the hardware device is an electronic switch or an electronic bridge.

14. A system having nondisruptive code loading capability, comprising:
   a) a hardware device;
   b) a runtime area of digital memory partitioned into a set of disjoint blocks beginning at fixed memory locations, said set including:
      (i) a fixed-dab block;
      (ii) a copier block comprising a fixed copier section and a copier expansion section, said fixed copier section and said copier expansion section being mutually disjoint; and
      (iii) a runtime code block;
   c) a trusted system state stored within the fixed-data block;
   d) a first runtime code, stored within the runtime code block, beginning at a runtime start address;
   e) a first copier code in assembly language, stored within the copier block, and having an instruction in the fixed-copier section;
   f) a shadow area of digital memory, disjoint from the runtime area;
   g) a second runtime code, stored within the shadow area; and
   h) a second copier code in assembly language, stored within the shadow area;
   wherein initiation of execution of the first copier code causes (i) the second copier code to be copied into the copier block without altering those instructions within the fixed copier section, (ii) execution of an instruction within the second copier code not in the first copier code, and (iii) the second runtime code to be copied into the runtime code block beginning at the runtime start address.

15. The system of claim 14, wherein the hardware device is an electronic switch or an electronic bridge.

16. A system having nondisruptive code loading capability, comprising:
   a) a hardware device;
   b) a runtime area of digital memory partitioned into a set of disjoint blocks beginning at fixed memory locations, said set including:
      (i) a fixed-data block;
      (ii) a copier block comprising a fixed copier section and a copier expansion section, said fixed copier section and said copier expansion section being mutually disjoint; and
      (iii) a runtime code block;
   c) a trusted system state stored within the fixed-data block;
   d) a first runtime code, stored within the runtime code block, beginning at a runtime start address;
   e) a first copier code in assembly language, stored within the copier block, and having an instruction in the fixed-copier section;
   f) a shadow area of digital memory, disjoint from the runtime area;
   g) a second runtime code, stored within the shadow area;
   h) a second copier code in assembly language, stored within the shadow area; and
   i) a loader/decompressor code, stored within the shadow area, containing instructions to decompress the second runtime code into uncompressed instructions and load said uncompressed instructions into the runtime code block beginning at the runtime start address;
   and wherein initiation of execution of the first copier code causes (i) the second copier code to be copied into the copier block without altering those instructions within the fixed copier section, (ii) execution of an instruction within the second copier code not in the first copier code, and (iii) a transfer of control to the loader/decompressor code.

17. The system of claim 16, wherein the hardware device is an electronic switch or an electronic bridge.

18. A method for nondisruptive code loading of a device, comprising:
   a) storing a first copier code in a copier block of memory, said copier memory block located within a runtime area of memory on the device and said copier block comprising a fixed copier section and a copier expansion section;
   b) storing a first runtime code within a runtime code block of memory located within the runtime area of memory and disjoint from the copier block;
   c) initiating execution of the first runtime code at a runtime start address, said first runtime code maintaining a trusted system state, containing a set of variable values required for proper operation of the device, within a fixed-data block, said fixed data block located within the runtime area and disjoint from the copier block and the runtime code block;
   d) staging a second copier code and a second runtime code into a shadow area of the device, disjoint from the runtime area;
   e) stopping execution of the first runtime code;
   f) initiating execution of the first copier code, which copies the second copier code into the copier block, overwriting the fixed-copier section without altering the fixed copier section, said copying resulting in execution of a composite copier instruction set comprising instructions from the first copier code and the second copier code;
   g) loading the second runtime code into the runtime code block in an uncompressed form, beginning at the runtime start address; and
   h) initiating execution of the second runtime code from the runtime start address, proper operation of the device requiring that the trusted system state has been unchanged while execution of the first runtime code has been stopped.

19. The method of claim 18, further comprising:
   i) saving any interrupts generated by the device on a stack;
   j) restoring servicing of interrupts.

20. The method of claim 19, wherein the loading step is performed by the composite copier instruction set.

21. The method of claim 19, wherein the second runtime code is staged into the shadow area in compressed form, and further comprising:
   k) staging a loader/decompressor into the shadow area of the device;
   l) transferring control from the composite copier instruction set to the loader/decompressor; and l) decompressing by the loader/decompressor of the second runtime code into uncompressed form.

22. The method of claim 18, wherein the hardware device is an electronic switch or an electronic bridge.

23. A method for nondisruptive code loading of a device, comprising:
   a) storing a first copier code in a copier block of memory, said copier memory block located within a runtime area of memory on the device and said copier block comprising a fixed copier section and a copier expansion section;
   b) storing a first runtime code within a runtime code block of memory located within the runtime area of memory and disjoint from the copier block;
   c) initiating execution of the first runtime code at a runtime start address, said first runtime code maintaining a trusted system state, containing a set of variable values required for proper operation of the device, within a fixed-data block, said fixed data block located within the runtime area and disjoint from the copier block and the runtime code block;
   d) staging a second copier code and a second runtime code into a shadow area of the device, disjoint from the runtime area;
   e) stopping execution of the first runtime code;
   f) saving any interrupts generated by the device on a stack;
   g) initialing execution of the first copier code, which copies the second copier code into the copier block, overwriting the fixed-copier section without altering the fixed copier section, said copying resulting in execution of a composite copier instruction set comprising instructions from the first copier code and the second copier code;
   h) loading by the composite copier instruction set of the second runtime code into the runtime code block in an uncompressed form, beginning at the runtime start address;
   i) initiating execution of the second runtime code from the runtime start address, proper operation of the device requiring that the trusted system state has been unchanged while execution of the first runtime code has been stopped; and
   j) restoring servicing of interrupts.

24. A method for nondisruptive code loading of a device, comprising:
   a) storing a first copier code in a copier block of memory, said copier memory block located within a runtime area of memory on the device and said copier block comprising a fixed copier section and a copier expansion section;
   b) storing a first runtime code within a runtime code block of memory located within the runtime area of memory and disjoint from the copier block;
   c) initiating execution of the first runtime code at a runtime start address, said first runtime code maintaining a trusted system state, containing a set of variable values required for proper operation of the device, within a fixed-data block, said fixed data block located within the runtime area and disjoint from the copier block and the runtime code block;
   d) staging a second copier code, a second runtime code, and a loader/decompressor into a shadow area of the device, disjoint from the runtime area;
   e) stopping execution of the first runtime code;
   f) saving any interrupts generated by the device on a stack;
   g) initiating execution of the first copier code, which copies the second copier code into the copier block, overwriting the fixed-copier section without altering the fixed copier section, said copying resulting in execution of a composite copier instruction set comprising instructions from the first copier code and the second copier code;
   h) transferring control from the composite copier instruction set to the loader/decompressor;
   i) loading of the second runtime code into the runtime code block in an uncompressed form, beginning at the runtime start address;
   j) initiating execution of the second runtime code from the runtime start address, proper operation of the device requiring that the trusted system state has been unchanged while execution of the first runtime code has been stopped; and
   k) restoring servicing of interrupts.

* * * * *